United States Patent
Babaian et al.

(10) Patent No.: US 6,243,822 B1
(45) Date of Patent: *Jun. 5, 2001

(54) METHOD AND SYSTEM FOR ASYNCHRONOUS ARRAY LOADING

(75) Inventors: Boris A. Babaian; Mikhail L. Chudakov; Oleg A. Konopleff; Yuli K. Sakhin; Andrey A. Vechtomov, all of Moscow (RU)

(73) Assignee: Elbrus International Limited (KY)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/220,500

(22) Filed: Dec. 24, 1998

Related U.S. Application Data

(60) Provisional application No. 60/068,742, filed on Dec. 24, 1997.

(51) Int. Cl.[7] .................................................. G06F 15/00
(52) U.S. Cl. ............................ 713/400; 712/207; 711/213
(58) Field of Search .................................. 713/400, 502, 713/600; 712/207; 711/213

(56) References Cited

U.S. PATENT DOCUMENTS

| | | |
|---|---|---|
| 4,888,679 | 12/1989 | Fossum . |
| 5,379,393 | 1/1995 | Yang . |
| 5,754,876 * | 5/1998 | Tamaki et al. ............................ 712/4 |
| 5,761,706 | 6/1998 | Kessler . |
| 5,845,101 * | 12/1998 | Johnson et al. ....................... 712/207 |
| 5,860,017 | 1/1999 | Sharangpani . |
| 5,889,985 | 3/1999 | Babaian . |
| 5,958,040 * | 9/1999 | Jouppi .................................. 712/207 |
| 6,085,291 * | 7/2000 | Hicks et al. .......................... 711/137 |
| 6,134,643 * | 10/2000 | Kedem et al. ....................... 711/213 |

OTHER PUBLICATIONS

HPL Play–Doh Architecture Specification: Version 1.0 Vinod Kathail, Michael Schlansker, B. Ramakrishna Rau, Computer Systems Lab, HPL–93–80 Feb. 1994.

* cited by examiner

Primary Examiner—Dennis M. Butler
(74) Attorney, Agent, or Firm—Townsend and Townsend and Crew

(57) ABSTRACT

The present invention decreases the delay associated with loading an array from memory by employing an asynchronous array preload unit. The asynchronous array preload unit provides continuous preliminary loading of data arrays located in a memory subsystem into a prefetch buffer. Array loading is performed asynchronously with respect to execution of the main program.

6 Claims, 2 Drawing Sheets

METHOD AND SYSTEM FOR ASYNCHRONOUS ARRAY LOADING

This application claims priority of U.S. provisional application Ser. No. 60/068,742 filed Dec. 24, 1997.

BACKGROUND OF THE INVENTION

Off-chip memory access is, for the most part, significantly slower than CPU instruction execution. Data access from off-chip memory therefore acts as a bottleneck that decreases the speed at which the processor can execute programs. This is especially true when an entire array of data must be loaded from memory into registers.

SUMMARY OF THE INVENTION

The present invention decreases the delay associated with loading an array from memory by employing an asynchronous array preload unit. The asynchronous array preload unit provides continuous preliminary loading of data arrays located in a memory subsystem into a prefetch buffer. Array loading is performed asynchronously with respect to execution of the main program.

A preferred embodiment of the present invention comprises a loop program having two parts: an asynchronous part ("asynchronous program") and a synchronous part. The synchronous part of the loop program is part of the main program executed by the system. The asynchronous program performs preliminary loading of array elements from the memory subsystem into a special buffer. Execution of the asynchronous program is started by the main program which times the start of the asynchronous program so that before execution of the synchronous part of the loop program, the necessary array data are already in the prefetch buffer. The asynchronous part of the program works asynchronously and simultaneously with the main program execution.

The synchronous part of the loop program transfers array elements from the buffer to the register file and performs other necessary operations over array elements.

DETAILED DESCRIPTION OF THE PREFERRED EMBODIMENTS

Figure 1:
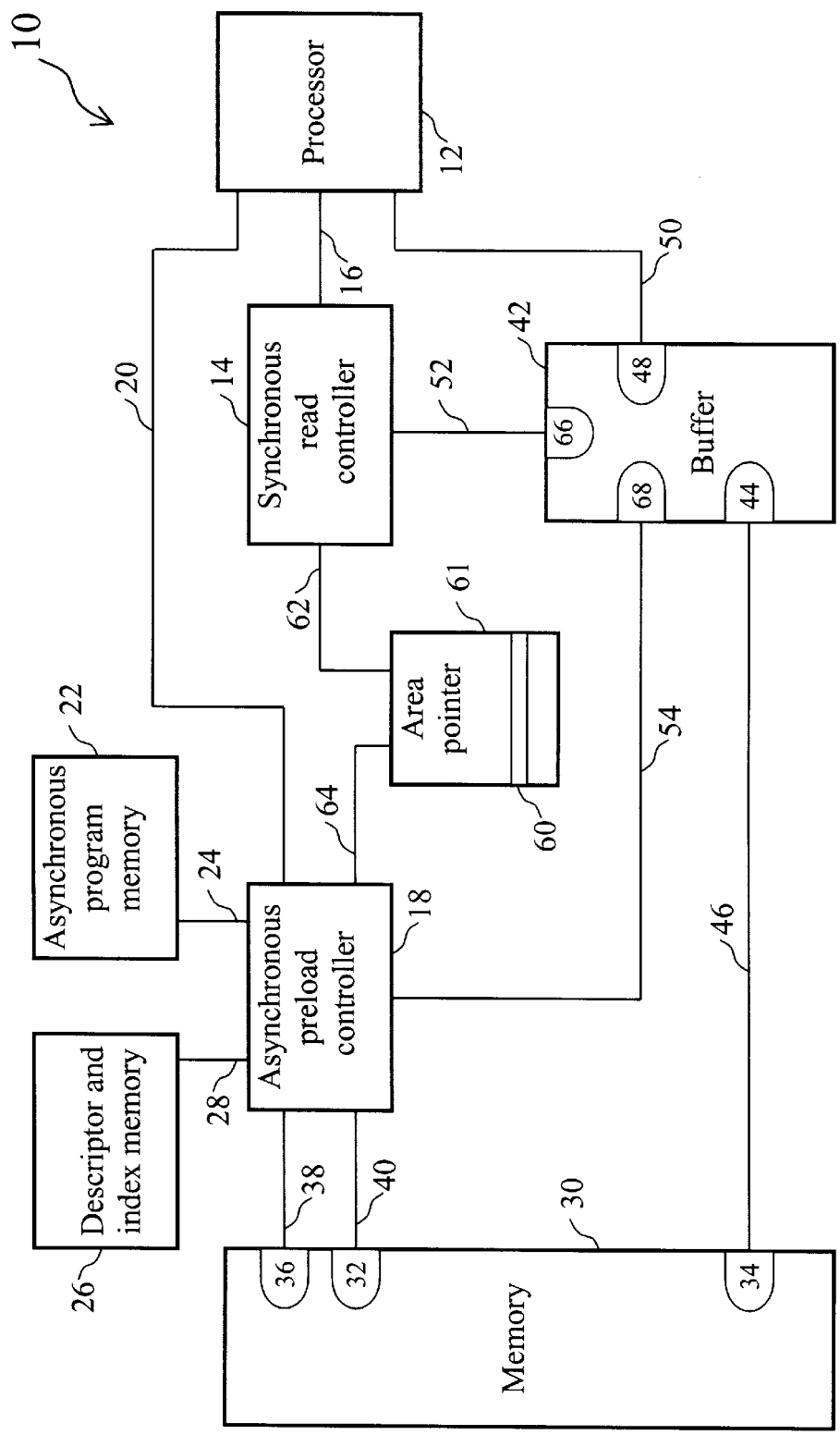
FIG. 1 is a block diagram of a preferred embodiment of a microprocessor system constructed according to the present invention.

A block diagram of a preferred embodiment of the present invention is shown in FIG. 1. As shown in FIG. 1, the preferred embodiment comprises a processing system 10 comprising a processor 12 executing a main program. Processor 12 is connected to a synchronous read controller 14 via a line 16 and to an asynchronous preload controller 18 via a line 20.

Asynchronous preload controller 18 is connected to an asynchronous program memory 22 via a line 24 and a descriptor and index memory 26 via a line 28.

The system further comprises a memory 30 having an address port 32, a data port 34 for both loading and storing data, and a read/write port 36. Asynchronous preload controller 18 is connected to read/write port 36 by a line 38 and to address port 32 by a line 40.

Figure 2:
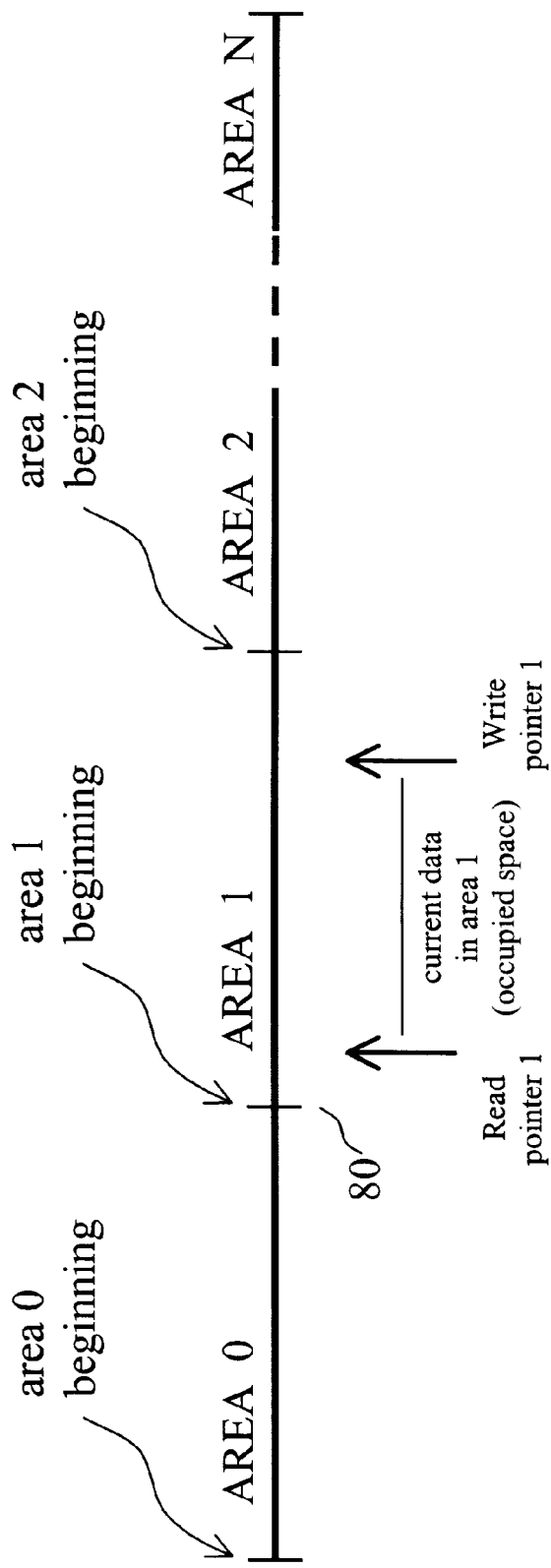
FIG. 2 is a schematic illustration of a buffer and an area pointer according to the present invention.

The system further comprises a buffer 42 having a plurality of storage areas. A schematic representation of an illustrative embodiment of buffer 42 is shown in FIG. 2. Each storage area has associated therewith an area pointer 60 stored in an area pointer memory 61. Each area pointer 60 consists of an "area beginning" field, an "area size" field, a "read pointer" field, and a "write pointer" field. The area beginning field identifies the beginning location of the area (e.g., location 80 in FIG. 2) and the area size field identifies the size of the area. The read pointer and write pointer fields identify particular locations within the area. Specifically, as described below, the read pointer and write pointer fields respectively identify the next read and write locations in the area.

Area pointer memory 61 is connected to synchronous read controller 14 via a line 62 and to asynchronous preload controller 18 via a line 64. A data input port 44 of buffer 42 is connected to data port 34 of memory 30 by line 46. A data output port 48 is connected to processor 12 by a line 50. Buffer 42 also has additional ports 66 and 68 suitable for receiving address information from synchronous read controller 14 and asynchronous preload controller 18 via lines 52 and 54, respectively. The minimal buffer size is determined by the memory access time and should provide continuous loop operation.

During compilation, the compiler generates the asynchronous part of the loop program which comprises one or more special preload instructions. Each preload instruction instructs asynchronous preload controller 18 to load particular array elements from memory 30 into a particular location in buffer 42. Before execution of the main program, this asynchronous program is stored in asynchronous program memory 22. Also before execution, descriptors, indices, and index increments are stored in descriptor and index memory 26.

The main program signals asynchronous preload controller 18 to start execution of the asynchronous program via line 20. When the start signal is received, asynchronous preload controller 18 begins to read instructions from asynchronous program memory 22. Each instruction instructs asynchronous preload controller 18 to perform a sequence of operations. In a preferred embodiment, the sequence of operations is as follows.

First, asynchronous preload controller 18 sets the area beginning and area size fields of an area pointer 60 via line 64. Asynchronous preload controller 18 then calculates an address from descriptor and index values stored in memory 26, transmits a load instruction for that address to memory 30 via lines 38, 40, and modifies the current index number using an increment number.

The above steps may be better understood with reference to the following example. Assume an array with 10 elements m1, m2, m3, . . . , m10. The descriptor for this array identifies the address of the location in memory 30 where the first element m1 of the array is stored. The index for the array identifies a displacement within the array, as described below. The increment value identifies the size of the step taken by the system when incrementing the index, as described below.

Assume, for example, that the descriptor for the array m is address A1 in memory 30; the index for the array is 3, and the increment is 2. Then, asynchronous preload controller calculates a load address equal to descriptor+index, i.e., A1 +3=A4. This address is transmitted to memory 30 and element m4 is read. Asynchronous preload controller 18 then increments the index by 2 (thus, index=5). Thus, when the next load instruction is executed, the load address will be A1+5=A6.

Asynchronous preload controller 18 then generates a write address specifying the target location in buffer 42 where the array data is to be written. This write address is generated from the area beginning and write pointer fields of the area pointer. The generated address is transmitted to buffer 42 via line 54. Asynchronous preload controller 18 then modifies the write pointer field of area pointer 60 via line 64 thus advancing the pointer to the right in the schematic illustration shown in FIG. 2. This moves the write pointer to the next location in buffer 42 to be written. In this way, asynchronous preload controller 18 generates memory access addresses and issues loads for array elements simultaneously with main program execution.

The main program accesses array elements from buffer 42 by buffer read instructions that incorporate buffer area pointers. When processor 12 perceives a buffer read instruction in the main program, it signals synchronous read controller 14 to access array data from buffer 42. Synchronous read controller 14 generates a buffer address from the area beginning and read pointer fields of the area pointer, and transmits the address to buffer 42 via line 52. Synchronous read controller 14 then modifies the read pointer value via line 62 thus advancing the pointer to the right in the schematic diagram shown in FIG. 2. This moves the read pointer to the next location in buffer 42 to be read and frees up space in the area. The array data is read out of buffer 42 and provided to a register file of processor 12 via line 50.

The main program preferably times the start signal of the asynchronous program so that by the time the synchronous part of the loop program is ready to execute all of the necessary data is stored in buffer 42. If, however, the necessary data is not yet stored in buffer 42, synchronous read controller 14 repeats buffer access until the array data arrive from memory 30.

What is claimed is:

1. An improved processing system, comprising:

a processor;

a memory;

an asynchronous preload controller connected to the processor and to an address port and a read/write port of the memory;

a synchronous read controller connected to the processor;
   a buffer connected to both the asynchronous preload controller and the synchronous read controller and having an input and an output,
   the input of the buffer being connected to a data port of the memory,
   the output of the buffer being connected to the processor.

2. The system of claim 1, further comprising:

an asynchronous program memory connected to the asynchronous preload controller and having stored therein an asynchronous loop program.

3. The system of claim 1, further comprising:

a descriptor and index memory connected to the asynchronous preload controller and having stored therein addresses of memory locations in the memory.

4. The system of claim 1 wherein the processor comprises a main program comprising synchronous loop instructions.

5. The system of claim 1 wherein the buffer is addressable.

6. The system of claim 1, further comprising an area pointers memory connected to the asynchronous preload controller and the synchronous read controller.

* * * * *